United States Patent
Suzuki

(12) 
(10) Patent No.: US 6,253,545 B1
(45) Date of Patent: Jul. 3, 2001

(54) INTERNAL COMBUSTION ENGINE HAVING LEAN NOX CATALYST

(75) Inventor: Makoto Suzuki, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/213,051

(22) Filed: Dec. 16, 1998

(30) Foreign Application Priority Data

Dec. 19, 1997 (JP) .................................... 9-351415
Feb. 27, 1998 (JP) .................................... 10-484400
Sep. 10, 1998 (JP) .................................... 10-257296

(51) Int. Cl.$^7$ .................................... F02M 25/06
(52) U.S. Cl. .................... 60/278; 60/280; 60/281; 60/599; 123/551
(58) Field of Search .................... 60/278, 279, 280, 60/281, 599; 123/547, 550, 551

(56) References Cited

U.S. PATENT DOCUMENTS

| | | |
|---|---|---|
| 2,290,330 | 7/1942 | Spackman . |
| 3,526,214 | 9/1970 | Kamo . |
| 4,002,025 | 1/1977 | Yamaguchi et al. . |
| 4,027,642 * | 6/1977 | Kamada et al. ............. 123/122 G |
| 4,030,464 | 6/1977 | Yamaguchi et al. . |
| 4,176,651 | 12/1979 | Backus . |
| 4,212,162 | 7/1980 | Kobayashi . |
| 4,749,028 * | 6/1988 | Okura et al. ............. 165/42 |
| 4,836,445 | 6/1989 | Okada . |
| 4,858,825 | 8/1989 | Kawamura . |
| 4,927,077 | 5/1990 | Okada . |
| 5,377,440 | 1/1995 | Eller et al. . |
| 5,402,757 | 4/1995 | Eller et al. . |
| 5,823,170 * | 10/1998 | Sienicki ............. 123/551 |
| 5,924,280 * | 7/1999 | Tarabulski ............. 60/274 |
| 5,950,620 * | 9/1999 | Geiger ............. 60/274 |
| 6,053,144 * | 4/2000 | Greenwood et al. ........ 123/294 |
| 6,119,660 * | 9/2000 | Suzuki ............. 123/501 |

FOREIGN PATENT DOCUMENTS

| | | |
|---|---|---|
| 4411959 | 10/1995 | (DE) . |
| 1497428 | 12/1967 | (FR) . |
| 2381175 | 9/1978 | (FR) . |
| 2041081 | 9/1980 | (GB) . |
| 1595060 | 8/1981 | (GB) . |
| 62-75069A | 4/1987 | (JP) . |
| 61-08827A | 4/1994 | (JP) . |
| 61-17225A | 4/1994 | (JP) . |
| 918466 * | 4/1980 | (RU) . |

OTHER PUBLICATIONS

U.S. application No. 09/165,222, filed Oct. 1, 1998.
U.S. application No. 09/204,895, filed Dec. 3, 1998.
U.S. application No. 09/193,431, filed Nov. 17, 1998.
U.S. application No. 09/213,051, filed Dec. 16, 1998.
Patent Abstracts of Japan, vol. 018, No. 600 (P–1826), Nov. 15, 1994 & JP 06 222867 A (Sharp Corp.), Aug. 12, 1994.
Patent Abstracts of Japan, vol. 005, No. 033 (M–057), Feb. 28, 1981 & JP 55 160 158 A (Nissan Motor Co., Ltd.), Dec. 12, 1980.

* cited by examiner

Primary Examiner—Thomas Denion
Assistant Examiner—Binh Tran
(74) Attorney, Agent, or Firm—Kenyon & Kenyon

(57) ABSTRACT

An engine having in an exhaust system a lean NOx catalyst for purifying nitrogen oxide in an oxygen excessive exhaust gas by using a reducing agent, includes an intake air quantity decreasing device for decreasing a quantity of intake air flowing through an intake system when the nitrogen oxide needs to be purified by the lean NOx catalyst, and a combustion heater provided separately from the internal combustion engine also serves as a $CO_2$ adding device for adding carbon dioxide to the intake air when a flowing quantity in the intake system decreases by operating the intake air quantity decreasing device. With this arrangement the reducing agent such as hydro carbon and the like can be supplied even when eliminating an auxiliary injection hitherto needed in the internal combustion engine having the lean NOx catalyst.

11 Claims, 8 Drawing Sheets

INTERNAL COMBUSTION ENGINE HAVING LEAN NOX CATALYST

BACKGROUND OF THE INVENTION

1. Field of the Invention

The present invention relates generally to an internal combustion engine having a lean NOx catalyst and, more particularly, to an internal combustion engine having a lean NOx catalyst for purifying nitrogen oxide in an exhaust gas by use of a reducer when an exhaust system is especially in an oxygen excessive atmospheric air state, i.e., in a lean state, the lean NOx catalyst is used as a ternary catalyst in a catalyst converter provided in an exhaust system of the internal combustion engine and functioning as an exhaust gas purifying device.

2. Description of the Prior Art

What is known as a catalyst used in the internal combustion engine such as a gasoline direct injection lean-burn engine, a diesel engine and the like, in which the atmospheric air in the exhaust system is in the oxygen excessive state while quantities of hydro carbon and carbon monoxide are small, is a so-called lean NOx catalyst for purifying nitrogen oxide contained in the exhaust gas by using the hydro carbon and the carbon monoxide as reducing agents.

The lean NOx catalyst disclosed in, e.g., Japanese Patent Application Laid-Open Publication No. 6-117225 involves the use of the hydro carbon as the reducing agent. According to the technology disclosed in this Publication, the hydro carbon is partially oxidized to generate active species, and the nitrogen oxide is purified by reducing it by causing reaction between the thus generated active species and the nitrogen oxide.

The hydro carbon as the reducing agent is a main component of a gasoline and a light oil as fuels of the internal combustion engine. Accordingly, as for a supply of the hydro carbon to the lean NOx catalyst, an extra fuel may be supplied into the cylinders separately from other fuels such as the gasoline supplied into the cylinders when in a normal combustion in the internal combustion engine. The extra fuel might cause an incomplete combustion, and hence the exhaust gas is discharged to the exhaust system in a state where the exhaust gas contains a raw gas, i.e., the hydro carbon. Then, according to the above Publication, the extra fuel is supplied by effecting a fuel injection different from the fuel injection normally conducted at an intake-compression stroke. Then, the former normal fuel injection of these injections is called a main injection, and the latter different fuel injection is referred to as an auxiliary injection. The auxiliary injection is executed by changing an injection timing within the same intake-compression stroke other than the injection at the intake-compression stroke based on the main injection, or executed at an exhaust stroke in addition to the main injection. Further, a fuel injection device used for the main injection serves also as a fuel injection device used for the auxiliary injection.

According to this technology, however, since the same fuel injection device performs the main injection and the auxiliary injection as well, a large load must be put on the fuel injection device. Hence, there arises a problem in which a durability of the fuel injection device declines.

SUMMARY OF THE INVENTION

It is a primary object of the present invention, which was devised under such circumstances to obviate the above problems, to provide an internal combustion engine having a lean NOx catalyst, which is capable of supplying a reducing agent such as hydro carbon even by eliminating an auxiliary injection.

To accomplish the above object, an internal combustion engine having a lean NOx catalyst according to the present invention adopts the following constructions.

According to a first aspect of the present invention, in an internal combustion engine having in an exhaust system a lean NOx catalyst for purifying nitrogen oxide in an exhaust gas in an oxygen excessive state by using a reducing agent, the internal combustion engine having the lean NOx catalyst comprises a $CO_2$ concentration increasing means for increasing a concentration of carbon dioxide in intake air flowing through an intake system of the internal combustion engine.

Herein, "the internal combustion engine having in the exhaust system the lean NOx catalyst for purifying the nitrogen oxide in the exhaust gas in the oxygen excessive state by using the reducing agent" refers to, e.g., a gasoline direct injection lean-burn engine and a diesel engine. In these engines, a rate of the air is by far larger than a rate of the fuel with respect to a mixing rate of the air and the fuel in cylinders. Hence, in the internal combustion engine according to the present invention, the exhaust gas contains a greater quantity of oxygen than in other internal combustion engine exhibiting a comparatively high air/fuel ratio, whereas the hydro carbon and the carbon monoxide are small in their quantities in the present invention. Further, the lean NOx catalyst is classified into a selective reduction type and an occlusive reduction type. The selective reduction type refers to a consecutive processing method of consecutively performing selective reduction and purification of the nitrogen oxide by feeding the hydro carbon and the carbon monoxide as reduction agents. The occlusive reduction type refers to an intermittent processing method by which the nitrogen oxide is absorbed into the catalyst for the time being in the lean atmosphere, and after the catalyst has become saturated with the nitrogen oxide, appropriate quantities of the hydro carbon and/or carbon monoxide are supplied as the reduction agents, thereby the nitrogen oxide absorbed in the catalyst is reduced and purified at one time.

"The $CO_2$ concentration increasing means" may be means which is capable of increasing the concentration of the carbon dioxide in a relative comparison of the carbon dioxide to components other than this among the components of the intake air containing the carbon dioxide. Hence, the $CO_2$ concentration increasing means may be either means for adding the carbon dioxide to the intake system or means capable of increasing the concentration of the carbon dioxide in comparison to other components by decreasing other components in the intake gas.

However, a device, e.g., an exhaust gas recirculation (EGR) device for increasing the concentration of the carbon dioxide in the intake system by utilizing the carbon dioxide contained in a gas, a so-called outgoing gas immediately after flowing out of an exhaust port of the internal combustion engine body, is excluded. In other words, the $CO_2$ concentration increasing means is directed to means which is capable of adding, to the intake system, $CO_2$ of which the concentration is higher than the concentration of the carbo dioxide contained in the exhaust gas circulated to the intake system by the EGR device. The reason for such a restriction is that since the EGR device re-utilizes the combustion gas in the internal combustion engine, the concentration of the carbon dioxide contained in the exhaust and recirculation gas recirculated to the intake system by the EGR device becomes variable depending on a combustion state in the internal combustion engine, and hence the concentration of the carbon oxide is controlled with difficulty.

In the internal combustion engine having the lean NOx catalyst according to the present invention, the $CO_2$ concentration increasing means increases the concentration of the carbon dioxide contained in the intake air, in which case the reactions both from the hydro carbon to the carbon monoxide and from the carbon monoxide to the carbon dioxide are difficult to occur. To say it extremely, when the carbon dioxide is in a saturated state, the oxidation reaction between the hydro carbon and the carbon monoxide which are necessary to produce the carbon dioxide is difficult to progress, and, therefore, it follows that large quantities of the hydro carbon and the carbon monoxide are contained in the exhaust gas of the internal combustion engine in a free state.

Namely, in the internal combustion engine having the lean NOx catalyst of the present invention, there increase rates at which the hydro carbon and the carbon monoxide-exist respectively as simple substances in the exhaust gas in the internal combustion engine. Hence, the lean NOx catalyst is capable of extremely effectively purify the nitrogen oxide, in which the hydro carbon and the carbon monoxide serve as reducing agents.

Then, since the hydro carbon and the carbon monoxide can be utilized as the reducing agents, there is no necessity for supplying the hydro carbon by the auxiliary injection as done in the prior art. Therefore, there is no concept of the technology of the auxiliary injection. Therefore, if generated quantities of the hydro carbon and the carbon monoxide are well controlled, an adverse effect attributed to the auxiliary injection, i.e.. a load upon the fuel injection device can be relieved, so that the fuel injection device can hardly be made to fall into a fault.

According to a second aspect of the present invention, in the internal combustion engine according to the first aspect of the invention, it is preferable that the $CO_2$ concentration increasing means be a $CO_2$ adding device for adding the carbon dioxide to the intake system.

According to a third aspect of the present invention, in the internal combustion engine according to the second aspect of the invention, it is desirable that the $CO_2$ adding device be a combustion device which is a separate body from the body of the internal combustion engine, and that a combustion gas emitted from this combustion device be introduced into the intake system of the internal combustion engine.

Herein, "the combustion device" is, to be specific, preferably a combustion heater device using, as a fuel, the fuel for combustion in the internal combustion engine. This is because the combustion heater emits an exhaust gas with a high concentration of the carbon dioxide. What is preferable as the combustion heater device is a device including a combustion chamber body, an air supply passageway for supplying the combustion chamber body with combustion air via an intake passageway defined as one of intake system structures constituting the intake system of the internal combustion engine, and a combustion gas discharge passageway for discharging the combustion gas burned there into the intake passageway.

The combustion device is provided separately from the body of the internal combustion engine, which means that the combustion device performs its own combustion separately from the combustion in the cylinders of the internal combustion engine body, and the combustion gas emitted from the combustion device at that time can be discharged into the intake passageway via the combustion gas discharge passageway. Based on even this meaning, the EGR device so structured to be included in the body of the internal combustion engine, is not embraced by the combustion device, more essentially, the $CO_2$ concentration increasing device. The combustion device of such a type, it is preferable, should be operated under a pressure lower than a pressure when burned within the cylinders of the internal combustion engine. As "the low pressure", for instance, an atmospheric pressure may be exemplified. The fuel is vaporized more easily under the low atmospheric pressure than in the high-pressure cylinders of the internal combustion engine. Hence, the fuel can be burned in closer proximity to a theoretical air/fuel ratio, so that the quantity of the carbon dioxide discharged can be increased. That is, the fuel is finely burned as the theory manifests, and therefore the combustion gas of this combustion device can be said to be high in its rate of the carbon dioxide.

According to a fourth aspect of the present invention, the internal combustion engine according to the third aspect of the invention may further comprise an intake air quantity decreasing means for decreasing a quantity of the intake air flowing through the intake system when the nitrogen oxide is required to be purified by the lean NOx catalyst. It is also preferable that the $CO_2$ adding device adds the carbon dioxide to the intake air in the intake system, of which the flowing quantity is decreased by the operation of the intake air quantity decreasing means.

Herein, "the time when the nitrogen oxide is required to be purified by the lean NOx catalyst" is the time when a specific condition needed for purifying the nitrogen oxide is prepared, and "the specific condition" implies, e.g., the time when lean NOx catalyst is activated. Then, a requirement for activating the catalyst is that the catalyst must exhibit a temperature enough to be activated. Hence, when the nitrogen oxide is required to be purified by the lean NOx catalyst, the catalyst must be in a temperature region enough to be activated and, if not, does not exhibit its function.

According to the present invention, when the nitrogen oxide is required to be purified by the lean NOx catalyst, the intake air quantity decreasing mechanism is operated, thereby decreasing the intake air flow quantity in the intake system. Then, the $CO_2$ adding device adds the carbon dioxide to the intake air of which the intake air flow quantity decreases, and hence the intake air flowing towards the interior of the internal combustion engine contains a considerably high concentration of the carbon dioxide. Besides, the $CO_2$ adding device according to the present invention supplies the carbon dioxide with the comparatively high concentration of the carbon dioxide as described above. Therefore, when the intake air with the high concentration of the carbon dioxide is supplied for the combustion in the internal combustion engine, the reactions both from the hydro carbon to the carbon monoxide and from the carbon monoxide to the carbon dioxide are quite difficult to occur. This is because the intake air contains a large quantity of the carbon dioxide, and therefore, to say it extremely, if the carbon dioxide is in the saturated state, the oxidation reaction between the hydro carbon and the carbon monoxide which are necessary to produce the carbon dioxide becomes difficult to progress. Hence, it follows that great amounts of the hydro carbon and the carbon monoxide exist in the exhaust gas in a free state.

Accordingly, in the present invention, the exhaust gas containing the large quantities of the hydro carbon and the carbon monoxide respectively in the form of simple substances acting as the reducing agents, is flowed to the lean NOx catalyst provided in the exhaust system, and, therefore, the nitrogen oxide can be highly effectively purified. Besides, according to the present invention, since the intake air quantity decreasing means decreases the intake air quantity, if the intake air quantity is decreased in such a state that the combustion heat in the internal combustion engine is set fixed, the intake air receives correspondingly an increased amount of heat from the internal combustion engine. Hence, the temperature of the exhaust gas rises, and the temperature of the lean NOx catalyst also rises upon receiving the heat of the exhaust gas having the increased temperature. with the result that the lean NOx catalyst reaches its activation temperature much earlier.

Further, according to the present invention, there is no necessity for supplying the hydro carbon by the auxiliary injection as done in the prior art. Consequently, the adverse effect derived from the auxiliary injection described in the prior art, i.e., the load upon the fuel injection device can be reduced, and, therefor, that the durability of the fuel injection device does not decline.

According to a fifth aspect of the present invention, in the internal combustion engine according to the fourth aspect of the invention, it is desirable that the intake air quantity decreasing means includes an intake air quantity regulating valve for opening and closing an intake passageway forming a part of the structure of the intake system, and thereby controlling the quantity of the intake air flowing through the intake passageway.

Herein "the intake air quantity regulating valve, has, e.g.. a valve driving unit for driving this valve, and the valve driving unit may be driven by a pressure control valve. For example, an actuator having a diaphragm may be exemplified as the "valve driving unit", and a VSV (vacuum switching valve) may also be exemplified as the pressure control valve. Then, the pressure control valve may preferably be controlled by a CPU (central processing unit) defined as a central unit of a computer, i.e., an ECU (electronic control unit).

According to a sixth aspect of the present invention, in the internal combustion engine according to the third aspect of the invention, it is desirable that the combustion device performs the combustion under a pressure lower than a pressure when burned in cylinders of the internal combustion engine.

According to a seventh aspect of the present invention, in the internal combustion engine according to the sixth aspect of the invention, the combustion device may be operated when requiring the purification of the nitrogen oxide by the lean NOx catalyst.

Herein, "the time when requiring the purification of the nitrogen oxide by the lean NOx catalyst", is the time when the combustion device is operated, and it refers to the time when a specific condition for purifying the nitrogen oxide is prepared. "The specific condition" in this case refers to, e.g., the time when the catalyst is activated. Namely, the catalyst is not yet activated immediately after starting the engine in the case of the selective reduction in the consecutive method, and hence the catalyst, though it does not yet function, becomes active and starts functioning after a short period of time. Hence, the time when requiring the purification of the nitrogen oxide by the lean NOx catalyst coincides with the time when the catalyst gets active and starts functioning in the case of the selective reduction. Further, in the case of the occlusive reduction in the intermittent method, the time when requiring the purification of the nitrogen oxide by the lean NOx catalyst coincides with the time when the catalyst excessively absorbs the nitrogen oxide, i.e.. the nitrogen oxide is in its saturated state.

According to an eighth aspect of the present invention, in the internal combustion engine according to the fifth aspect of the invention, the combustion device may be operated when the internal combustion engine is in a predetermined operation state and burns the fuel, and warm up engine related elements with the heat of the combustion gas emitted when burned.

Herein, "the time when the internal combustion engine is in the predetermined operation state" refers to (1) the internal combustion engine is in the midst of its operation at a cold time or an extremely cold time, (2) the time after starting the internal combustion engine at such cold or extremely cold time, (3) when an exothermic quantity of the internal combustion engine itself is small due to, e.g., a small consumption of the fuel, and (4) when a quantity of heat received by the cooling water is small due to the small exothermic quantity of the internal combustion engine itself, and a temperature of the cooling water is lower than a predetermined temperature. The cold time is that the outside air temperature is from about −10° C, to about 15° C. and the extremely cold time is that the outside air temperature is lower than about −10° C. For instance, 60° C. may be given as the predetermined temperature of the cooling water. Note that the same temperature or the region of same temperature might be, it can be considered, shared when the internal combustion engine is in the predetermined operation state and when the nitrogen oxide is required to be purified by the lean NOx catalyst. More specifically, it means that both the combustion device and the lean NOx catalyst function at a certain temperature or in a certain temperature region.

Herein "the engine related elements" include the engine cooling water or the internal combustion engine itself in which the combustion gas of the combustion heater is introduced into the intake air.

In the internal combustion engine having the lean NOx catalyst according to the present invention, the combustion gas emitted from the combustion device operated when the internal combustion engine is in the predetermined operation state, is introduced into the intake system of the internal combustion engine, whereby the fresh air flowing so far through the intake system turns out to be a combustion gas mixed intake air holding the combustion heat of the combustion gas. Hence, the engine related elements are warmed up by utilizing the combustion heat of the combustion device, thereby making it feasible to speed up the warm-up of the engine and enhance a performance of the car room heater. Since the combustion heater is normally provided in the internal combustion engine as the combustion device, the combustion heater can be used also as means for increasing concentration of the carbon dioxide.

Moreover, the combustion heater emits the combustion gas emitting originally almost no smoke, in other words, containing no carbon and having a high concentration of the carbon dioxide. Therefore, when the combustion gas as described above is taken into the internal combustion engine, there must be a less possibility of causing the frictional wear and the corrosion of the internal combustion engine than by the hitherto-known EGR device, and improvement of the durability thereof can be also expected In addition, the carbon dioxide itself exhibits an effect of restraining the smokes. This lies in the following reason. To be specific, soot is re-burned by the oxygen generated due to a thermal dissociation of the carbon dioxide (namely, $CO_2 \rightarrow 2CO+O_2$ when a temperature of the atmospheric air is 1400° C.). and the carbon is oxidized by the carbon dioxide (namely, $CO_2+C \rightarrow 2CO$). Therefore, the smoke restraining effect can be expected even when the internal combustion engine has a high load.

Then, a low fuel consumption engine such as the diesel engine, the gasoline direct injection lean-burn engine and the like originally has a small thermal loss to the cooling water because of the burned fuel being small. Hence, there exists a tendency that the warm-up characteristic declines even at a normal temperature. The warm-up characteristic can be, however, remarkably improved by operating the combustion heater when required. As a result, the emission when warmed up can be largely improved. Besides, since the exhaust heat of the combustion heater is collected by the internal combustion engine, the heat received by the cooling water on the side of the internal combustion engine increases, whereby the warm-up of the engine can be speeded up and, in the case of a vehicle equipped with the car room heater, a heating performance thereof can be enhanced.

Moreover, since the combustion gas discharge passageway of the combustion heater communicates with the intake system, unburned components in the combustion gas when the combustion heater is actuated are re-burned in the internal combustion engine and can be, upon arriving at the exhaust system of the internal combustion engine, purified by the lean NOx catalyst provided in this exhaust system.

According to a ninth aspect of the present invention, in the internal combustion engine according to the fourth aspect of the invention, it is desirable that the combustion device is operated when the internal combustion engine is in a predetermined operation state and burns the fuel, then warms up the engine related elements with the heat of the combustion gas emitted when burned, and an air/fuel ratio be changed at the time when the internal combustion engine is in the predetermined operation state and at the time when the nitrogen oxide is required to be purified by the lean NOx catalyst.

Herein, the definition of "the time when the internal combustion engine is in the predetermined operation state" is as described in the description of the seventh aspect of the present invention.

In the internal combustion engine having the lean NOx catalyst according to the present invention, when the internal combustion engine is in the predetermined operation state, the combustion device separate from the internal combustion engine operates and burns the fuel, and the engine related elements are warmed up by the heat of the combustion gas emitted when burned. Therefore, when the internal combustion engine is in the predetermined operation state, i.e., when the internal combustion engine is operated in such a condition that the temperature of the outside air is low enough to be under the temperature at the cold time, the combustion gas of the combustion device is mixed into the intake system, at which time the fresh air flowing so far to the intake system becomes the combustion gas mixed intake air holding the combustion heat of the combustion gas. Therefore, the warm-up of the internal combustion engine can be speeded up. Further, the internal combustion engine is connected to the car room heater via the cooling water passageway through which to flow the cooling water for warming up the interior of the car room of the vehicle mounted with the internal combustion engine, and the combustion device is provided in this cooling water passageway. With this arrangement, the cooling water flowing through the cooling water passageway serves as a heat medium and receives the heat from the combustion device, and the beat obtained from this heat receiving process can be radiated from the car room heater. This contributes to enhance the performance of the car room heater. Moreover, it is preferable that the air/fuel ratio be changed respectively at the time when the internal combustion engine is in the predetermined operation state and at the time when the purification of the nitrogen oxide by the lean NOx catalyst is required. Therefore, in the case of using the combustion device as a heating device for enhancing the performance of the car room heater as well as speeding up the warm-up, the air/fuel ratio of the combustion device is set suitable thereto and preferably set, e.g., lean. Being lean. however, it is desirable that this be within a limit to which the incomplete combustion may not occur. Further, when requiring the purification of the nitrogen oxide by the lean NOx catalyst, the air/fuel ratio of the combustion device is set suitable thereto and preferably set, e.g., rich. Being rich, however, it is desirable that this be within a limit to which the smoke is not produced.

With these arrangements, the single combustion device can serve as the heating device and also as the $CO_2$ adding device in such a state that the functions thereof can be sufficiently exhibited. If the air/fuel ratio is set lean within a range where a sufficient thermal quantity is obtained when the combustion device is made to function as the heating device, there must be a small consumption of the fuel. Further, there is a request for setting such an air/fuel ratio as to obtain sufficient CO, when the combustion device is made to function as the $CO_2$ adding device. That is, the air/fuel ratio demanded differs depending on when the combustion device functioning as the heating device and when functioning as the $CO_2$ adding device.

The combustion heater, although separated in terms of its usage, as described above, emits the combustion gas originally producing almost no smoke when used in a normal state, in other words, containing no carbon, and having the high concentration of the carbon dioxide. Accordingly, there is a less possibility of causing the frictional wear and the corrosion of the internal combustion engine than by the hitherto-known EGR device, and improvement of the durability thereof can be also expected.

Further, according to the prior art, the requirement for enabling the EGR device to operate is that the temperature of the cooling water must be as high as, e.g., "60° C." or higher. According to the present invention, however, the nitrogen oxide can be decreased even when the cooling water is at a temperature below the temperature at the cold time.

According to a tenth aspect of the present invention, in the internal combustion engine according to the first aspect of the invention, the lean NOx catalyst may be an occlusive reduction type NOx catalyst.

According to an eleventh aspect of the present invention, in the internal combustion engine according to the first aspect of the invention, the lean NOx catalyst is a selective reduction type NOx catalyst.

According to a twelfth aspect of the present invention, in the internal combustion engine according to the eighth aspect of the invention, when the nitrogen oxide is required to be purified by the lean NOx catalyst, it is preferable that the air/fuel ratio of the combustion device be set rich.

If the air/fuel ratio is rich, there must be a large quantity of fuel in the air-fuel mixture in the combustion device, the rates of the hydro carbon and of the carbon monoxide serving as the reducing agents increase correspondingly, and hence the lean NOx catalyst gets easier to purify the nitrogen oxide.

According to a thirteenth aspect of the present invention, in the internal combustion engine according to the eighth aspect of the invention, when the nitrogen oxide is required to be purified by the lean NOx catalyst during an operation of the combustion device, it is preferable that a fuel injection timing by a fuel injection device be lagged. The fuel injection timing is originally set so that a fuel efficiency becomes optimal. If the fuel injection timing is lagged, however, the combustion is correspondingly lagged. If the combustion is lagged, the fuel which should be originally burned might remain unburned, and there increases a rate of generation of the unburned gas. Consequently, the rates of the hydro carbon and the carbon monoxide increase, whereby the lean NOx catalyst becomes easier to purify the nitrogen oxide.

According to a fourteenth aspect of the present invention, in the internal combustion engine according to the thirteenth aspect of the invention, it is preferable that the lean NOx catalyst be an occlusive reduction type NOx catalyst.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
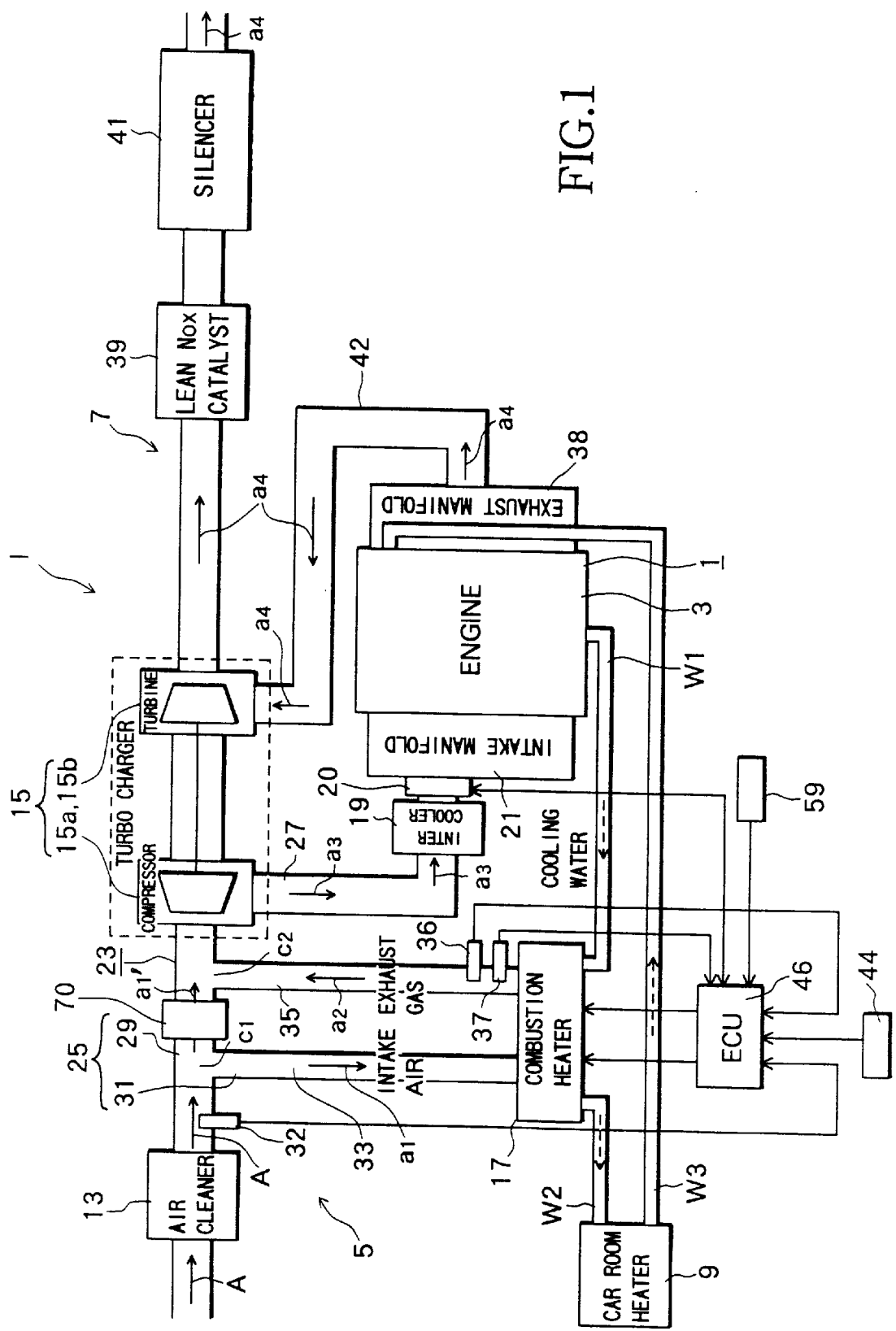
FIG. 1 is a diagram schematically illustrating a construction of an internal combustion engine having a lean NOx catalyst in an embodiment of the present invention.

Embodiments of the present invention will hereinafter be described with reference to the accompanying drawings.
<General Description of the Apparatus>

An engine 1 is classified as a water cooling type internal combustion engine, and includes an engine body 3 including an unillustrated water jacket through which the cooling water is circulated, an air intake device 5 for supplying a plurality of unillustrated cylinders of the engine body 3 with the air needed for combustion, an exhaust device 7 for discharging into the atmospheric air an exhaust gas produced after an air-fuel mixture composed of the air from the air intake device 5 and an injection fuel from an unillustrated fuel injection device, has been burned in the cylinders, and a car room heater 9 for warming the interior of a car room of a vehicle mounted with the engine 1. The engine 1 is a diesel engine or a gasoline direct-jet lean-burn engine.
<Air Intake Device 5>

The air intake device 5 structurally starts with an air cleaner 13 for taking the fresh air into the cylinders and terminates with an unillustrated intake port of the engine body 3. From the air cleaner 13 down to the intake port, the air intake device 5 is provided, as the structure of an intake system, with a compressor 15a of a turbo charger 15, a combustion heater 17 for executing combustion under an atmospheric pressure lower than a pressure when burned in the unillustrated cylinders of the engine body 3, an inter cooler 19, an air intake quantity decreasing means 20 for decreasing a quantity of the intake air flowing through the intake system, and an intake manifold 21.

There is an intake pipe 23 serving as an intake passageway having a plurality of connecting pipes, and the intake pipe 23 forms a part of the structure of the intake system.
<Intake Pipe 23>

The intake pipe 23 is roughly divided by the compressor 15a as a boundary into a downstream-side connecting pipe 27 which is brought into a pressurized state because of the outside air entering the air intake device 5 being forcibly intruded by the compressor 15a, and an upstream-side connecting pipe 25 which is not brought into the pressurized state.
<Upstream-side Connecting Pipe 25>

The upstream-side connecting pipe 25 is, referring to FIG. 1, constructed of a rod-like mainstream pipe 29 extending straight from the air cleaner 13 toward the compressor 15a, and a branch pipe 31 for the heater as a tributary pipe connected in bypass to the mainstream pipe 29.
<Outside Air Temperature Sensor 32>

An outside air temperature sensor 32 is attached to a portion, in the vicinity of a downstream-side of the air cleaner 13, of the mainstream pipe 29. Outside air A entering the mainstream pipe 29 from the air cleaner 13 is the fresh air for the combustion heater 17 as well as for the engine 1, and the outside air sensor 32 detects a temperature of the outside air A.
<Branch Pipe 31 for Heater>

The branch pipe 31 for heater includes the combustion heater 17 disposed midways of this pipe 31. The branch pipe 31 for heater has an air supply passageway 33 for supplying the combustion heater 17 with the fresh air, i.e., the air from the mainstream pipe 29 and connecting an upstreamside portion of the combustion heater 17 in an air flowing direction to the mainstream pipe 29, and a combustion gas discharge passageway 35 for discharging a combustion gas emitted from the combustion heater 17 into the mainstream pipe 29 as well as for connecting a downstream-side portion of the combustion heater 17 in the air flowing direction to the mainstream pipe 29. Note that the air related to the branch pipe 31 for heater refers to not only fresh air a1 flowing via the air supply passageway 33 toward the combustion heater 17 but also a combustion gas a2 discharged from the combustion heater 17 via the combustion gas discharge passageway 35 toward the mainstream pipe 29. In general, the combustion gas from the combustion heater is a gas emitting almost no smokes, in other words, containing no carbon in a normal combustion state, which is the same with the combustion heater 17 in this embodiment. It is therefore no problem to use the combustion gas a2 from the combustion heater 17 as the intake air of the internal combustion engine. Further, the air a2 flowing back to the mainstream pipe 29 is a combustion gas burned under the atmospheric pressure in the combustion heater 17 and consequently holding the heat, and therefore contains a large quantity of carbon dioxide.

A combustion gas temperature sensor 36 and a $CO_2$ sensor 37 for detecting a concentration of the carbon dioxide contained in the combustion gas, are fitted to portions, closer to the combustion heater 17, of the combustion gas discharge passageway 35.

The combustion gas temperature sensor 36 detects a temperature of the combustion gas of the combustion heater 17 before entering into the mainstream pipe 29 from the combustion heater 17, while the $CO_2$ sensor 37 detects the concentration of the carbon dioxide in the combustion gas. Hence, the combustion heater 17 leads the combustion gas containing the carbon dioxide to the mainstream pipe 29 via the combustion gas discharge passageway 35, thereby adding the carbon dioxide to the intake air flowing so far in the mainstream pipe 29. Thus, while this combustion heater 17 is a combustion device, it is also called a $CO_2$ adding device.

Further, with respect to individual connecting points c1, c2 respectively connecting the air supply passageway 33 to the mainstream pipe 29, and the combustion gas discharge passageway 35 to the mainstream pipe 29, the connecting point c1 is disposed more upstream of the mainstream pipe 29 than the connecting point c2. Therefore, the outside air (the fresh air) A from the air cleaner 13 is separated into the air a1 branching off at the connecting point c1 to the heater branch pipe 31, and air a1' flowing toward the connecting point c2 through the mainstream pipe 29 without branching. The air a1 branching off at the connecting point c1 flows via a route of the air supply passageway 33→the combustion heater 17→the combustion gas discharge passageway 35, and flows back as the air a2 to the mainstream pipe 29 from the connecting point c2. Further, the air a2 becomes confluent with the fresh air a1' at the connecting point c2, and turns out to be combustion gas mixed air a3.

The air a2 returning to the mainstream pipe 29 is the combustion gas which is, as described above, burned under the atmospheric pressure in the combustion heater and holds the heat, and therefore contains the large quantity of carbon dioxide. This gas a2 gets confluent with the air a1' at the connecting point c2 and becomes the combustion gas mixed air a3, as a result of which this combustion gas mixed air a3 turns out the intake air entering the engine body 3 in such a state as to contain the large quantity of carbon dioxide. It is to be noted that a combustion state in the combustion heater 17 is controlled by a CPU functioning as the central unit of an ECU 46. Then, an air/fuel ratio of the combustion heater 17 is adjusted under this control, whereby the concentration of the carbon dioxide can be controlled.

<Downstream-side Connecting Pipe 27>

The downstream-side connecting pipe 27 is, as shown in FIG. 1, a pipe for connecting the compressor 15a to the intake manifold 21, and takes substantially an L-shape in this embodiment. Further, the inter cooler 19 is disposed at a portion, closer to the intake manifold 21, of the downstream-side connecting pipe 27, and the intake manifold 21 is so provided with the intake air quantity decreasing means 20 as to be integral therewith.

<Intake Air Quantity Decreasing Means 20>

The intake air quantity decreasing means 20 is disposed at an unillustrated intake port of the intake manifold 21, and incorporates an unillustrated intake air quantity regulating valve. The intake air quantity regulating valve has an actuator for driving this valve, and this actuator is driven by a VSV (vacuum switching valve). For the sake of simplicity, as in the case of the intake air quantity regulating valve, it is considered that the intake air quantity decreasing means 20 includes the actuator and the VSV, and therefore these components are shown en bloc by way of the intake air quantity decreasing means 20. Note that the VSV is controlled by the CPU of the ECU 46.

<Exhaust Device 7>

On the other hand, the exhaust device 7 structurally starts with an unillustrated exhaust port of the engine body 3 and terminates with a silencer 41. From the exhaust port down to the silencer 41, the exhaust device 7 is provided with an exhaust manifold 38, a turbine 15b of the turbo charger 15 and a catalyst converter 39 along an exhaust pipe 42, all of which are the structures constituting the exhaust system. The air flowing through the exhaust device 7 is designated by a reference symbol a4 as an exhaust gas of the engine 1.

<Catalyst Converter 39>

The catalyst converter 39 uses the lean NOx catalyst therein as a ternary catalyst, and purifies the nitrogen oxide in the exhaust gas by using a reducer when the exhaust system is especially in an oxygen excessive atmospheric state, i.e., in a lean state. The lean NOx catalyst is classified into the selective reduction type and the occlusive reduction type, however, the lean NOx catalyst of the occlusive reduction type is used herein.

<Combustion Heater 17>

Figure 2:
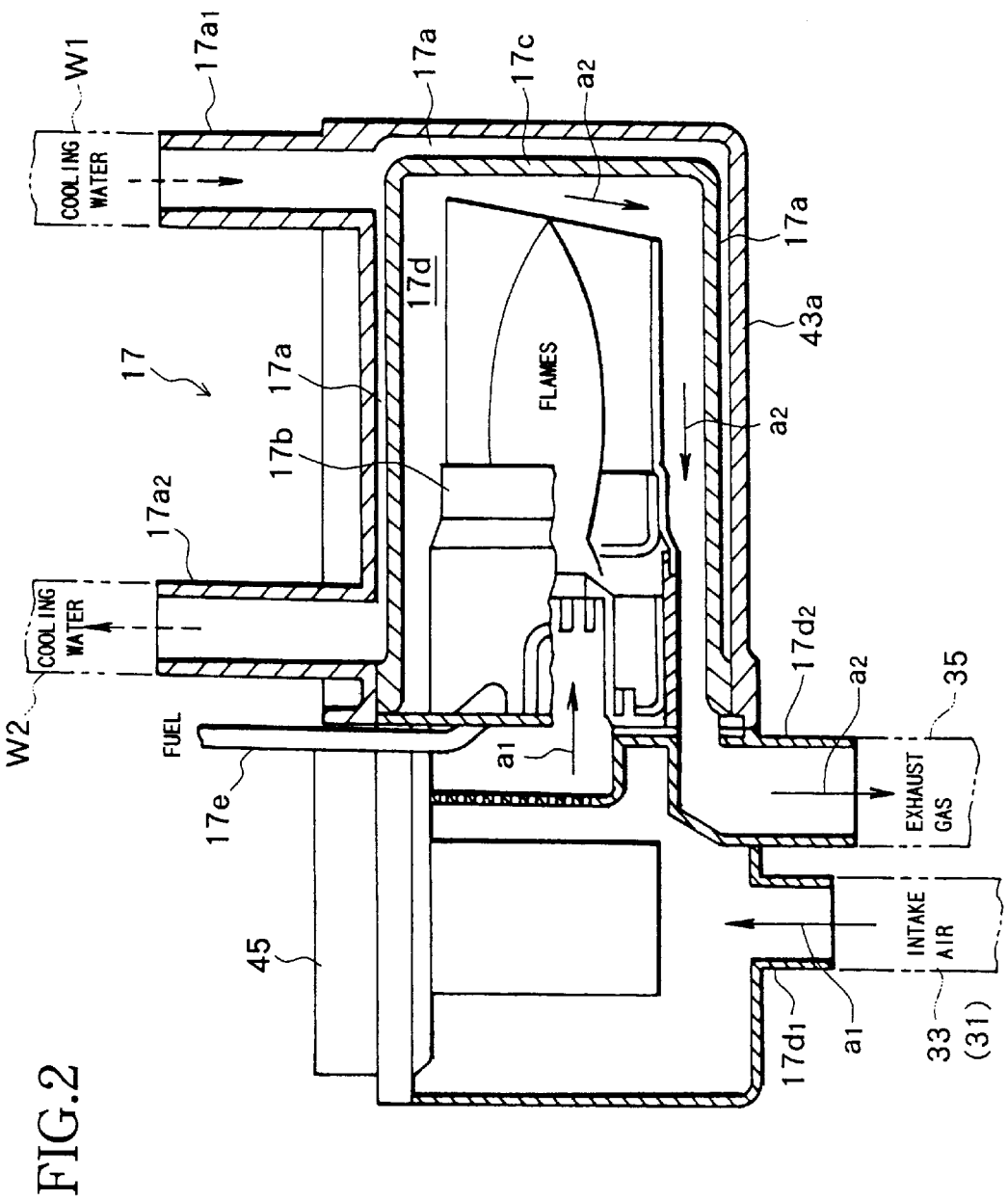
FIG. 2 is a sectional view schematically showing a combustion heater in the embodiment of the present invention.

Next, a structure of the combustion heater 17 is schematically shown in FIG. 2.

The combustion heater 17 is connected to the water jacket of the engine body 3 and includes a cooling water passageway 17a through which to flow cooling water from the water jacket thereinto. The cooling water (indicated by the broken line with an arrow in FIG. 2) flowing through the cooling water passageway 17a passes through round a combustion chamber 17d serving as a combustion unit formed inside of the combustion heater 17, during which the cooling water receives the heat from the combustion chamber 17d and is thus warmed up. This process will be sequentially discussed in greater details.

<Combustion Chamber 17d>

The combustion chamber 17d is constructed of a combustion cylinder 17b from which flames are emitted, and a cylindrical partition wall 17c for covering the combustion cylinder 17b to prevent the flames from leaking outside. The combustion cylinder 17b is covered with the partition wall 17c, whereby the combustion chamber 17d is defined inside of the partition wall 17c. Then, the partition wall 17c is also covered with an external wall 43a of the combustion heater 17, with a space between the partition wall 17c and the external wall 43a. With this spacing, the cooling water passageway 17a is defined between an inner surface of the external wall 43a and an outer surface of the partition wall 17c.

Further, the combustion chamber 17d has an air supply port 17d1 and an exhaust gas discharge port 17d2, which are respectively connected directly to the air supply passageway 33 and to the combustion gas discharge passageway 35. The air a1 supplied from the air supply passageway 33, upon entering the combustion chamber 17d via the air supply port 17d1, flows therethrough and arrives at the exhaust gas discharge port 17d2, Thereafter, as described above, the air a1 flows via the combustion gas discharge passageway 35 into, as the air a2, the mainstream pipe 29. Hence, the combustion chamber 17d takes the form of an air passageway that admits the air a1 changed into the air a2 due to the combustion in the combustion heater 17.

Then, the air a2 flowing back to the mainstream pipe 29 via the combustion gas discharge passageway 35 after the combustion in the combustion heater 17, is, so to speak, an exhaust gas discharged from the combustion heater 17 and therefore holds the heat. Then, the air a2 holding the heat flows out of the combustion heater 17 to the combustion gas discharge passageway 35, during which the heat held by the air a2 is transmitted via the partition wall 17c to the cooling water flowing through the cooling water passageway 17a, thus warming up the cooling water as explained above. Accordingly, the combustion chamber 17 serves also as a heat exchange passageway.

<Combustion Cylinder 17b>

The combustion cylinder 17b includes a fuel supply pipe 17e connected to an unillustrated fuel pump, and a fuel for combustion is, upon receiving a pump pressure of the fuel pump, supplied therefrom to the combustion cylinder 17b. The combustion fuel supplied is vaporized within the combustion heater 17, thereby becoming a vaporized fuel. This vaporized fuel is ignited by an unillustrated ignition source.

Further, the air supply passageway 33 and the combustion gas discharge passageway 35 are used for only the combustion heater 17 and therefore belong to the combustion heater 17.

<Circulation of Cooling Water>

Next, a circulation of the cooling water through the cooling water passageway 17a will be described.

The cooling water passageway 17a has a cooling water intake port 17a1 connected to the water jacket of the engine body 3, and a cooling water discharge port 17a2 connected to the car room heater 9.

A water conduit W1 is provided between the cooling water intake port 17a1 and the engine body 3, and the cooling water discharge port 17a2 is connected through a water conduit W2 to the car room heater 9.

The combustion heater 17 is connected via these water conduits W1, W2 to the water jacket and the car room heater 9 as well. Further, the car room heater 9 is connected via a water conduit W3 to the engine body 3.

Accordingly, the cooling water in the water jacket of the engine body 3 flows, according to a first flow sequence (1) thereof, through the water conduit W1 and arrives at the combustion heater 17 via the cooling water intake port 17a1, and is warmed up there. In a second flow sequence (2), the warmed-up cooling water flows from the cooling water discharge port 17a2 of the combustion heater 17 and arrives at the car room heater 9 through the water conduit 12. Then, in a third flow sequence (3), the cooling water, of which the temperature decreases by the heat exchange with the car room heater 9, thereafter flows back to the water jacket via the water conduit W3. Note that the water jacket is fitted with a water temperature sensor 44 for detecting a temperature of the cooling water.

Thus, the cooling water is circulated between the engine body 3, the combustion heater 17 and the car room heater 9 via the water conduits W1, W2, W3.

Further, other than those described above, an air blowing fan 45 is provided within a combustion chamber body 43.

<Electric Connection of ECU 46>

On the other hand, the ECU 46 is electrically connected to the intake air quantity decreasing means 20, the outside air temperature sensor 32, the combustion gas temperature sensor 36, the $CO_2$ sensor 37, the water temperature sensor 44, a rotational speed sensor 59, the air blowing fan 45 and the fuel pump. Then, the CPU, when judging from respective parameters of the sensors 32, 36, 37, 44 and 59 that the nitrogen oxide is required to be purified by the lean NOx catalyst 39, adequately controls the combustion state in the combustion heater 17, and maintains a force, a magnitude and a temperature of the flames of the combustion heater 17 in optimal states. Further, a temperature of the exhaust gas from the combustion heater 17 and a quantity of the carbon dioxide contained in the combustion gas are adjusted by the CPU's controlling of the combustion state in the combustion heater 17. Namely, the CPU controls the air/fuel ratio in the combustion heater 17. A content of this control will be discussed in greater details with reference to a flowchart of an operation control execution routine of the combustion heater 17. Furthermore, "the time when the nitrogen oxide is required to be purified by the lean NOx catalyst 39" refers to the time when the specific condition needed for the purification of the nitrogen oxide is prepared, and the specific condition to be satisfied is a condition that the lean NOx catalyst 36 be activated and purifies occluded NOx (at an interval of, e.g., a predetermined operation time). Then, what is needed for activating the lean NOx catalyst 39 is that a temperature of the catalyst itself must come to a given temperature. Hence, when the nitrogen oxide is required to be purified by the lean NOx catalyst 39, the lean NOx catalyst 39 does not perform its function unless the catalyst 39 is in a temperature region enough to activate the catalyst itself.

Moreover, the CPU controls of the operations of the actuator and the VSV of the intake air quantity decreasing means 20 in accordance with the parameters of the sensors 32, 36, 37, 44 and 59, thereby controlling opening and closing of the intake air quantity regulating valve. Note that "the opening and closing of the intake air quantity regulating valve" refers to, for the sake of convenience, the operation of the intake air quantity decreasing means 20 in this specification. The operation control of the intake air quantity decreasing means 20 will be also described in greater detail by referring to the flowchart of the operation control execution routine of the combustion heater 17.

<Airflow Meter 70>

An airflow meter 70 is provided at a portion of the mainstream pipe 29 located between the connecting points C1, C2. The airflow meter 70 used in this embodiment is an air flow meter of, e.g., a hot wire type or film type, having a less pressure difference between an inlet side and an outlet side thereof.

<Operation Control Execution Routine of Combustion Heater 17>

Figure 3:
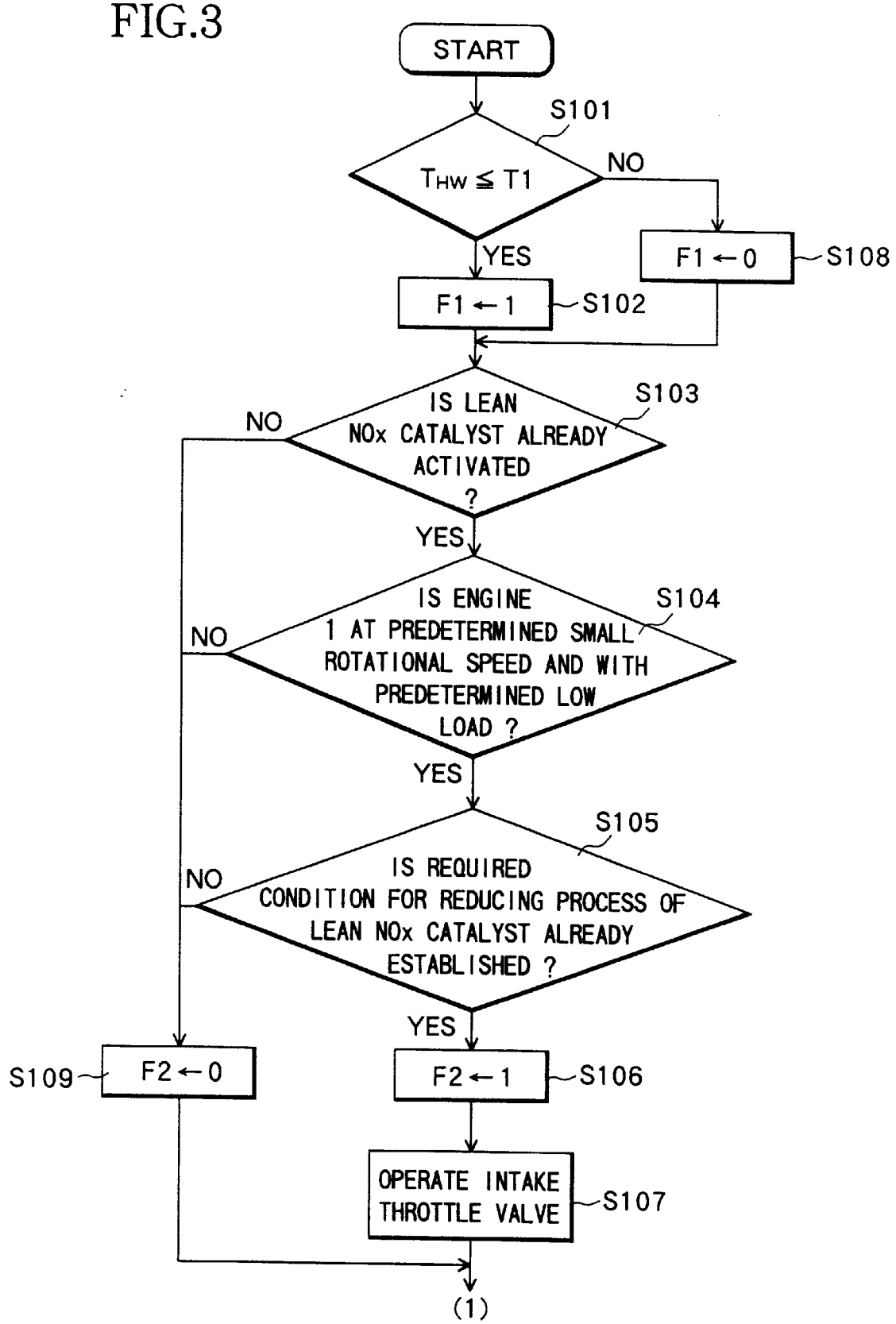
FIG. 3 is a flowchart showing a part of an operation control execution routine of the combustion heater in the embodiment of the present invention.
Figure 4:
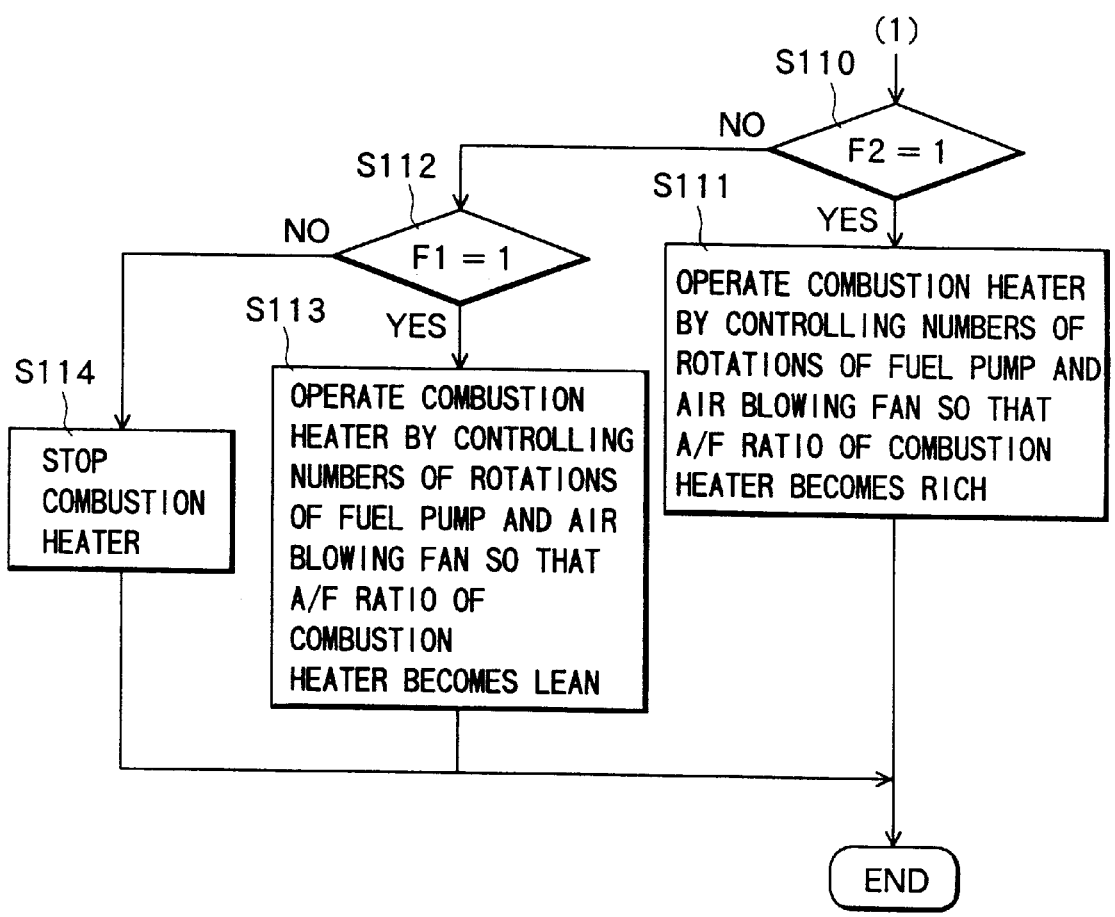
FIG. 4 is a flowchart showing another part of the operation control execution routine of the combustion heater in the embodiment of the present invention.

Next, the operation control execution routine of the combustion heater 17 is described by referring to FIGS. 3 and 4. Note that the illustrations in FIGS. 3 and 4 should be originally given en bloc on the same sheet but are divided into two drawing sheets due to a limited space on the sheet. The reference numeral (1) shown at the boom of FIG. 3 corresponds to the numeral (1) shown at the top of FIG. 4, which indicates a shift of the process from (1) in FIG. 3 to (1) in FIG. 4.

This routine is a part of an unillustrated normal flowchart for driving the engine 1, and consists of steps S101–S114 which will be hereinafter described. A ROM of the ECU 46 stores therein a flowchart structured by those steps. Further, all the operations based on the below described procedures are executed by the CPU of the ECU 46. Note that the steps are expressed by using the symbol S such as S101 in the case of, e.g., the step 101.

After starting the engine 1, when the process shifts to this routine, to begin with, it is judged in S101 whether or not the engine 1 is in an operation state where the combustion heater 17 needs to be actuated. This judgement is made depending on whether or not a cooling water temperature $T_{HW}$ detected by the water temperature sensor 44 is equal to or lower than a predetermined temperature T1. If judged to be affirmative in S101, the CPU sets a value of a combustion heater execution flag F1 to "1" in S102, and advances to S103. "The operation state where the combustion heater 17 needs to be actuated" might occur, for example, during the operation of the engine 1 at the cold time or at the extremely cold time or after starting the internal combustion engine, or when the exothermic quantity of the internal combustion engine itself is small and when the heat received by the cooling water is thereby small. Hence, in this case, the cooling water temperature $T_{HW}$ is also, as a matter of course, low, e.g., approximately 60° C.

If the cooling water temperature $T_{HW}$ is higher than 60° C, this indicates that the engine 1 is in an operation state where there is no necessity for actuating the combustion heater 17, and hence a negative judgement is made in S101. Then, the CPU thereafter sets the value of the combustion heater execution flag F1 to "0" in S108, and advances to S103.

In S103, the CPU judges whether the lean NOx catalyst 39 is already in the state of being activated or not. Whether or not the lean NOx catalyst 39 is activated, in other words, whether or not a catalyst activation temperature is reached, is judged depending on whether or not an integrated value obtained by integrating on a fuel injection quantity of an unillustrated injector after the engine 1 has started, reaches a predetermined value. The CPU, if judged to be affirmative in S103, advances to the next S104. The CPU, whereas if judged to be negative, diverts to S109. The integrated amount of the fuel injection quantity of the injector is corresponding to an integrated value of the number of execution command signals of fuel injection given to the injector from the CPU, and the CPU, when the integrated value of the number of execution command signals occurred has reached a predetermined integrated value, judges that the lean NOx catalyst 39 is activated.

The CPU judges in S104 whether or not the engine 1 is operated at a predetermined small rotational speed in a low load region. The CPU, if judged to be affirmative in S104, advances to S105 and, whereas if judged to be negative, diverts to S109. The following is the reason for judging whether or not the engine 1 is operated at the small rotational speed in the low load region. That is, in the case of driving the engine 1 at the small rotational speed in the low load region, the injection fuel quantity needed is originally small. Therefore, even when the intake air quantity is reduced by operating the intake air quantity decreasing means 20, the air/fuel ratio when burned in the combustion chamber of the engine body 3 does not become rich, and hence an emission of smokes can be restrained. By contrast, in the case of driving the engine 1 at a large rotational speed in a high load region, the injection fuel quantity needed is originally large. Therefore, when the intake air quantity is reduced by operating the intake air quantity decreasing means 20, the air/fuel ratio when burned in the combustion chamber of the engine body 3 becomes rich, and hence the emission of smoke can not be restrained.

The CPU judges in S105 whether the necessary condition for executing a reducing process by the lean NOx catalyst 39 is established or not. The CPU, if judged to be affirmative in S105, advances to S106 and, whereas if judged to be negative, diverts to S109. The judgement about whether or not the necessary condition for executing the reducing process by the lean NOx catalyst 39 is established, implies a judgement about whether or not the lean NOx catalyst, which has occluded a predetermined quantity of nitrogen oxide, is in a state where the nitrogen oxide should be reduced. This judgement is, after starting the engine 1, made depending on whether the integrated value obtained by integrating on the fuel injection quantity of the injector reaches the predetermined value. Namely, the judging method is the same as the method in S103.

In S106, the CPU sets a value of a reducing process execution flag F2 to "1", and thereafter advances to S107. Further, in S109 in the case of making the negative judgements in S103, S104 and S105, the CPU sets the value of the reducing process execution flag F2 to "0". When making the negative judgements in S103–S105, the CPU thereafter diverts to S110.

The CPU judges in S110 whether or not the reducing process execution flag F2 is set to "1" and, if judged to be affirmative, advances to S111. Whereas if judged to be negative, i.e., when the reducing process execution flag F2 is set to "0", the CPU advances to S112.

In S11, the combustion heater 17 is operated in such a state as to restrain the rotational speeds of the fuel pump and of the air blowing fan 45 of the combustion heater 17 so that an air/fuel ratio A/F of the combustion heater 17 becomes rich, and this routine comes to an end.

In S112, the CPU judges whether or not the combustion heater execution flag F1 is set to "1". The CPU, if judged to be affirmative. advances to S113 and, whereas if judged to be negative, advances to S114.

In S113, the combustion heater 17 is operated in such a state as to restrain the rotational speeds of the fuel pump and of the air blowing fan 45 of the combustion heater 17 so that the air/fuel ratio A/F of the combustion heater 17 becomes lean, and this routine is ended.

In S114, since the operation state of the engine 1 is not the state where the combustion heater 17 is to be operated, the combustion heater 17 is stopped, and thereafter this routine is halted.

That has been described above is the construction of the internal combustion engine 1 having the lean NOx catalyst in the embodiment of the present invention.

<Operation and Effect of the Embodiment>

Given next is a description of the operation and effects of the thus constructed internal combustion engine 1 having the lean NOx catalyst.

According to the internal combustion engine 1 having the lean NOx catalyst 39, the combustion gas a2 of the combustion heater 17 arrives at the intake pipe 23 via the combustion gas discharge passageway 35, whereby the concentration of the carbon dioxide increases in the air intake system. Consequently, the reactions both from hydro carbon to carbon monoxide and from the carbon monoxide to the carbon dioxide are difficult to occur in the combustion within the cylinders of the engine body 3.

Namely, to say it extremely, assuming that the carbon dioxide is in the saturated state in the cylinders, the chemical reaction between the hydro carbon and the carbon monoxide which constitute the carbon dioxide is difficult to progress, and therefore it follows that the carbon monoxide and the hydro carbon as Nox reducing agents are in a free state and have proper quantities. Hence, the purification of the nitrogen oxide can be extremely effectively done.

If the intake air quantity decreasing means 20 is operated when requiring the purification of the nitrogen oxide by the lean NOx catalyst 39, the intake air flow rate through the air intake system decreases. Then, the combustion heater 17 serving as the $CO_2$ adding device adds the carbon dioxide to the intake air which is in the state where the intake air flow rate decreases, and hence the intake air flowing toward the interior of the engine body 3 has a much higher concentration of the carbon dioxide. Therefore, when the intake air exhibiting the high concentration of the carbon dioxide is supplied to the combustion of the engine 1, the reactions both from the hydro carbon to the carbon monoxide and from the carbon monoxide to the carbon dioxide are even more difficult to occur in the combustion within the cylinders of the engine body 3. This is because the intake air contains a large quantity of carbon dioxide, and namely, to say it extremely, if the carbon dioxide is in the saturated state, the oxidation reactions of the hydro carbon and the carbon monoxide which produce the carbon dioxide becomes difficult to progress. Hence, it follows that a much larger quantity of the hydro carbon and the carbon monoxide might exist in the free state in the exhaust gas.

Accordingly, in the internal combustion engine 1 having the lean NOx catalyst, the exhaust gas containing the great amount of the hydro carbon and the carbon monoxide as simple substances, which act as the reducing agents, is flowed to the lean NOx catalyst provided in the exhaust system, and therefore the nitrogen oxide can be purified extremely effectively. Besides, the intake air quantity decreasing means 20 decreases the intake air quantity. Therefore, when the intake air quantity is reduced in a state where the combustion heat of the engine 1 is set fixed, the quantity of the heat received by the intake air from the engine 1 increases corresponding thereto. As a result, the temperature of the exhaust gas rises, and accordingly the temperature of the lean NOx catalyst also rises while receiving the heat of this exhaust gas, thereby speeding up a process to reach the activation temperature.

Further, the internal combustion engine 1 having the lean NOx catalyst utilizes the hydro carbon and the carbon monoxide as the reducing agents which are supplied from the combustion heater 17, and hence, there is no necessity for supplying the hydro carbon by an auxiliary injection as done in the prior art. Therefore, an adverse effect attributed to the auxiliary injection as described in the prior art, i.e., a load upon the fuel injection device can be reduced, so that the fuel injection device is difficult to fall into a fault.

<Comparative Diagrams Showing Generated Quantities of Nitrogen Oxide, Hydro Carbon and Carbon Monoxide>

Figure 5:
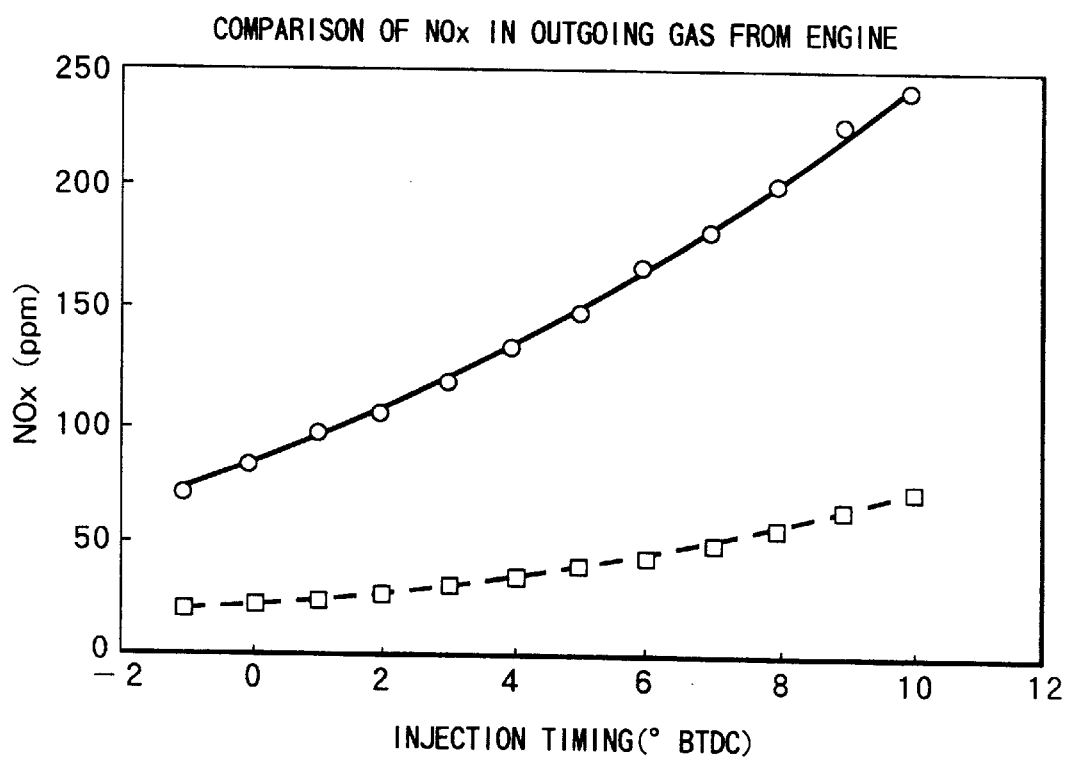
FIG. 5 is a graphic chart showing a comparison in terms of a generated quantity of nitrogen oxide between the prior art and the embodiment of the present invention.
Figure 6:
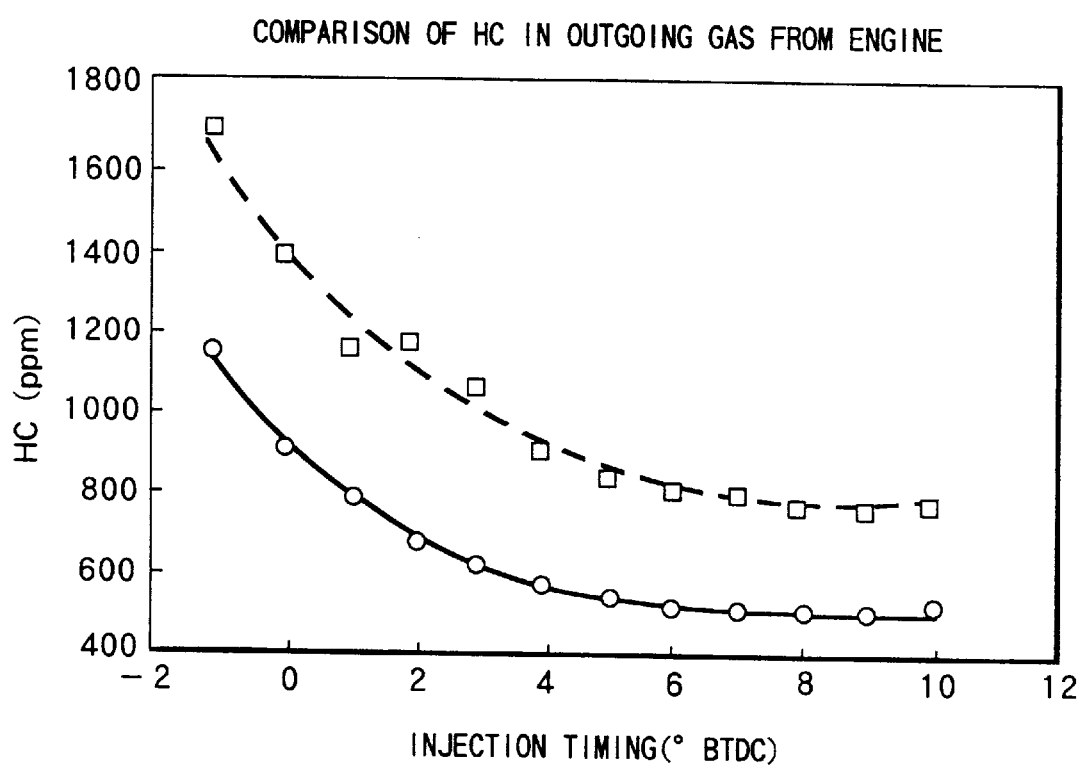
FIG. 6 is a graphic chart showing a comparison in terms of a generated quantity of hydro carbon between the prior art and the embodiment of the present invention.
Figure 7:
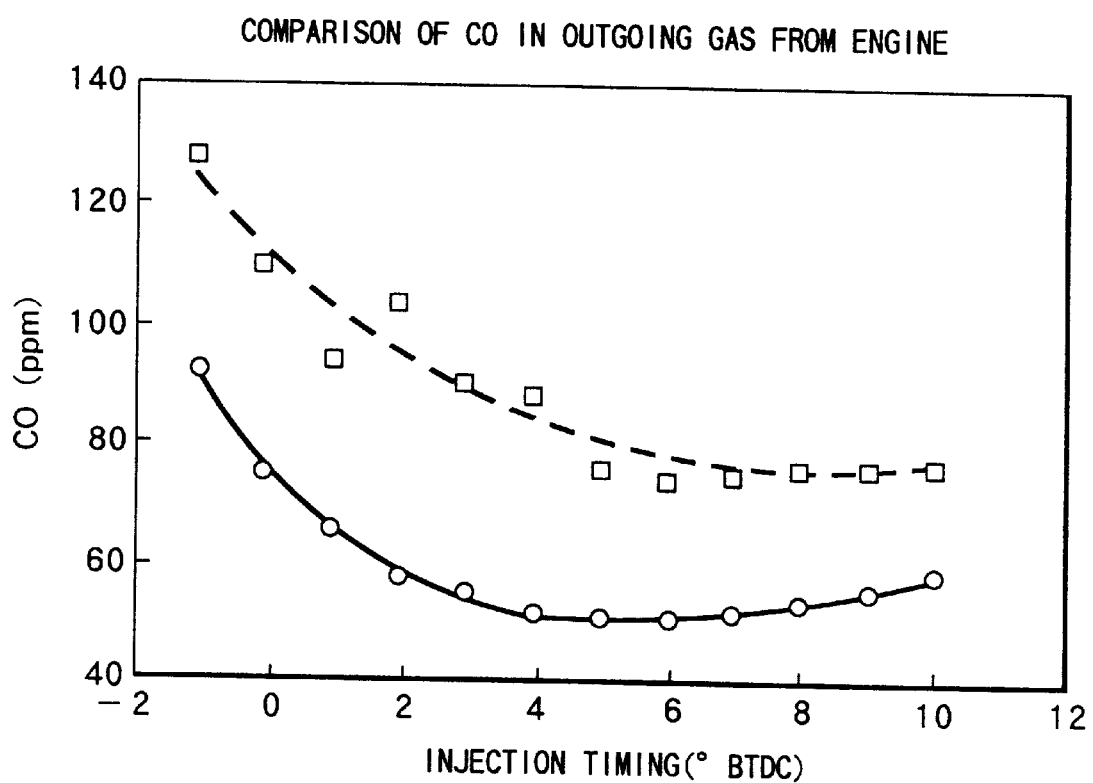
FIG. 7 is a graphic chart showing a comparison in terms of a generated quantity of carbon monoxide between the prior art and the embodiment of the present invention.

FIGS. 5, 6 and 7 are comparative diagrams showing differences in terms of generated quantities of the nitrogen oxide, hydro carbon and the carbon monoxide between the internal combustion engine 1 having the lean NOx catalyst and the prior art.

FIGS. 5, 6 and 7 respectively show a rate of each of the nitrogen oxide, the hydro carbon and the carbon monoxide contained in the exhaust gas. The solid lines in these Figures indicate the rates in the prior art, while the broken lines indicate those according to the internal combustion engine 1 having the lean NOx catalyst. Further, the axis of ordinates shows the generated quantity of each substance, while the axis of abscissa shows an injection timing of the fuel by way of a crank angle. The numerical values displayed along the axis of abscissa correspond to the crank angles. wherein the numerical value "0" refers to a top dead center. Hence, the numerical values from "0" to the right side in the Figures show so-called timing advances, and similarly the numerical values closer to the left side show so-called timing lags.

It can be understood from these Figures that the nitrogen oxide is purified highly effectively because of angles of inclination of the graphs being extremely small. Further it can be also understood from FIGS. 6 and 7 that there are generated much greater amounts of the hydro carbon and the carbon monoxide than ever before at any crank angles. Therefore, the hydro carbon and the carbon monoxide can be effectively utilized as the reducing agents of the lean NOx catalyst 39.

Further, according to the internal combustion engine 1 having the lean NOx catalyst, there increases the rates of the hydro carbon and the carbon monoxide which exist as the simple substances. Then, the hydro carbon and the carbon monoxide, which are supplied from the combustion heater 17, are utilized as the reducing agents, and hence, unlike the prior art, there is no necessity for supplying the hydro carbon by the auxiliary injection.

For this reason, if the generated quantities of the hydro carbon and the carbon monoxide from the combustion heater 17 can be well controlled the adverse effect derived from the auxiliary injection, i.e., the load exerted upon the fuel injection device can be reduced, so that the fuel injection device becomes difficult to fall into the breakdown. Further, the purification of the nitrogen oxide can be suitably controlled. The way of controlling the generated quantities of the hydro carbon and the carbon monoxide is explained in applied examples which will hereinafter be discussed.

Further, in the internal combustion engine 1 having the lean NOx catalyst, the combustion gas a2 emitted from the combustion heater 17 is mixed in the intake pipe 23, whereby the fresh air a1 flowing so far through the intake system becomes the combustion gas mixed intake air a3 holding the combustion heat of the combustion gas a2. It is therefore feasible to speed up the warming of the engine and enhance the performance of the car room heater by utilizing the combustion heat of the combustion heater 17. The internal combustion engine normally includes the combustion heater, and hence the combustion heater 17 can serve as the $CO_2$ adding device (a $CO_2$ concentration increasing device).

Furthermore, it is preferable that the air/fuel ratio be changed (1) during the operation of the engine 1 or after starting the internal combustion engine at the cold time and at the extremely cold time, or when the exothermic quantity of the internal combustion engine itself is small and consequently the heat received by the cooling water is small, and (2) when the nitrogen oxide is required to be purified by the lean NOx catalyst. In the case of using the combustion heater 17 as a heating device for speeding up the warm-up of the engine and enhancing the performance of the car room heater, it may be preferable that the air/fuel ratio of the combustion heater 17 be lean. Being lean, however, it is desirable that this be within a limit to which the incomplete combustion may not occur.

Further, when the nitrogen oxide is required to be purified by the lean NOx catalyst, it is preferable that the air/fuel ratio be set rich. Being set rich, however, it is desirable that this be within a limit to which no smoke is produced.

With these arrangements, the single combustion device can serve as the heating device and also as the $CO_2$ adding device in such a state that the functions thereof can be sufficiently exhibited.

Moreover, the combustion heater 17 emits the combustion gas with almost no smoke, in other words, containing no carbon and having the high concentration of the carbon dioxide. Therefore, when this combustion gas is sucked into the cylinders of the engine 1, there might be a less possibility of causing the frictional wear and the corrosion of the internal combustion engine than by the EGR device hitherto known as the Nox reducing device, and it can be expected that the durability be enhanced. Besides, the nitrogen oxide can be reduced because of the low water temperatures.

In addition, the carbon dioxide itself has a smoke restraining effect. Therefore, the smoke restraining effect can be expected even when the engine 1 has a high load.

Then, the low fuel consumption engine 1 such as the diesel engine, the gasoline direct injection lean-burn engine and the like originally have a small thermal loss to the cooling water because of the burned fuel being small. Hence, the engine 1 has a tendency that the warm-up characteristic declines even at a normal temperature. The warm-up characteristic can be, however, remarkably improved by operating the combustion heater 17 when required. As a result, the emission when warmed up can be largely improved. Besides, since the exhaust heat of the combustion heater 17 is collected by the engine body 3, the heat received by the cooling water increases, thereby enhancing the heater performance.

Moreover, since the combustion gas discharge passageway 35 of the combustion heater 17 communicates with the intake pipe 23, unburned components in the exhaust gas when the combustion heater 17 is actuated are re-burned in the cylinders of the engine body 3 and can be, upon arriving at the exhaust system of the engine 1, purified by the lean NOx catalyst 39 provided in this exhaust system.

Further, the air supply passageway 33 and the combustion gas discharge passageway 35 of the combustion heater 17 are not open directly to the atmospheric air, and hence an effect of reducing the noises can be expected.

<Applied Examples>

The method of suitably controlling the purification of the nitrogen oxide by controlling the generated quantities of the hydro carbon and the carbon monoxide, will be exemplified as described in the following items (1) and (2).

(1) In the case of purifying the nitrogen oxide by controlling air/fuel ratio of the combustion heater 17.

When the nitrogen oxide is required to be purified by the lean NOx catalyst, the air/fuel ratio of the combustion heater 17 is set rich.

If the air/fuel ratio is rich, the quantity of the fuel in the air-fuel mixture in the combustion heater 17 is large, and correspondingly the rates of the hydro carbon and the carbon monoxide as the reducing agents increase. Consequently, it becomes easier for the lean NOx catalyst 39 to purify the nitrogen oxide. Hence, the auxiliary injection can be eliminated.

(2) In the case of purifying the nitrogen oxide by changing the fuel injection timing.

Then the nitrogen oxide needs to be purified by the lean NOx catalyst 39 during operation of the combustion heater 17, it is preferable that the fuel injection timing by the fuel injection device be more lagged than when the reducing process is not yet executed (a reducing process non-execution time). The fuel injection timing is normally set so that the fuel consumption is optimal. If the fuel injection timing is lagged, however, the combustion is correspondingly lagged. If the combustion is lagged, there must remain unburned substances of the fuel which should be originally burned, resulting in an increase in the rate of the unburned gas. Therefore, the rates of the hydro carbon and the carbon monoxide increase, whereby it makes the lean NOx catalyst easy to purify the nitrogen oxide. Consequently, the auxiliary injection can be eliminated.

Further, when the nitrogen oxide is not required to be purified by the lean NOx catalyst 39 during operation of the combustion heater 17, the fuel injection timing by the fuel injection device is more advanced than when the reducing process is executed (a reducing process execution time). If the fuel injection timing is advanced, the time required for discharging the combustion gas from the combustion chamber is made longer correspondingly, and hence an occurrence of after-burn can be expected, and the temperature of the exhaust system rises due to the occurrence of the after-burn. Consequently, the activation of the lean NOx catalyst 39 progresses, and therefore the occlusion of the nitrogen oxide to the catalyst 39 is speeded up. Then, if the absorption of the nitrogen oxide to the catalyst 39 becomes excessive, and when the lean NOx catalyst 39 is saturated with the nitrogen oxide, as described above, the lean NOx catalyst 39 purifies the nitrogen oxide by lagging the fuel injection timing.

Figure 8:
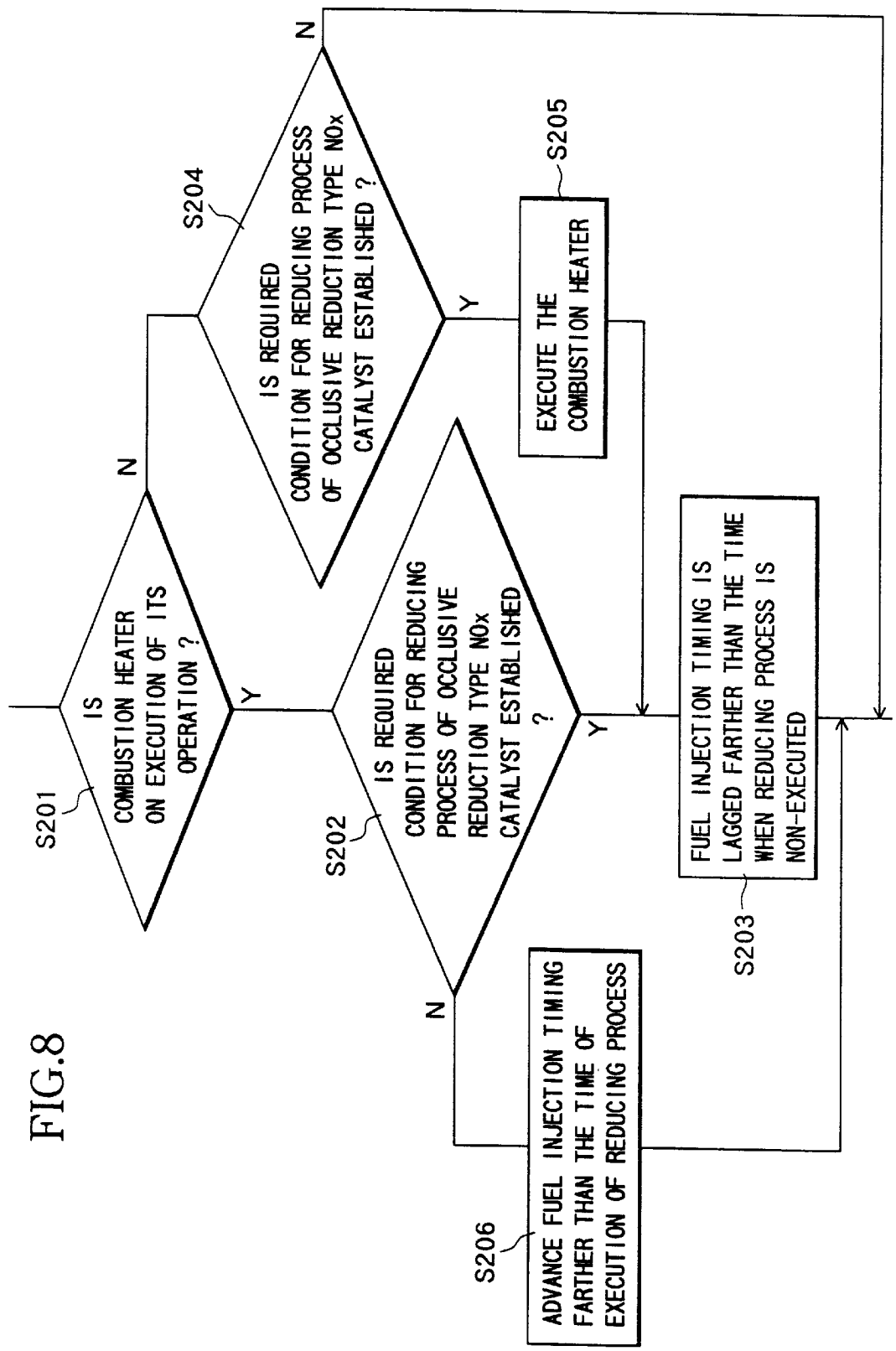
FIG. 8 is a flowchart showing an operation control routine of the combustion heater when purifying the nitrogen oxide by lagging an injection timing.

An operation control routine of the combustion heater 17 in the case of purifying the nitrogen oxide by changing the injection timing in the way described above, will be described by referring to a flowchart shown in FIG. 8. In this case, it is considered that the lean NOx catalyst 39 is of the occlusive reduction type.

This routine is a part of the normal flowchart (not shown) for driving the engine 1 and consists of steps 201–206 which will hereinafter be described. Further, all the operations in the following procedures are executed by the CPU of the ECU 46. Then, the reference symbol "S" designates the step, and, for instance, step 201 is expressed by S201 in an abbreviated form.

Then the process shifts to this routine after the engine 1 has been started, the CPU judges in S201 whether or not the combustion heater 17 is operated, in other words, whether in the midst of an execution of operation of the combustion heater or not. If judged to be affirmative in S201, the CPU advances to S202 and, whereas if judged to be negative, advances to S204.

The CPU judges in S202 whether or not the condition needed for the reducing process of the occlusive reduction type NOx catalyst is established, i.e., whether or not the absorption of the nitrogen oxide to the occlusive reduction type NOx catalyst becomes excessive and the nitrogen oxide is in its saturated state.

The CPU, if judged to be affirmative in S202, advances to S203 and, whereas if negative, advances to S206.

In S203, the processing, i.e., the fuel injection timing is more lagged than the reducing process non-execution time, and thereafter this routine is ended.

Now, return to S201, the CPU, if judged to be negative in S201. advances to S204, in which case the CPU judges whether or not the condition necessary for the reducing process of the occlusive reduction type NOx catalyst is established in the state where the combustion heater 17 is not operated, i.e., whether or not the occlusive reduction type NOx catalyst, as in the same way with S202, excessively absorbs the nitrogen oxide and is in the saturated state. The CPU, if judged to be affirmative in S204, advances to S205 and, if negative, terminates this routine.

In S205, the combustion heater 17 is operated.

Here, now return to S202. The CPU, if judged to be negative in S202, advances to S206, wherein the fuel injection timing is more advanced than at the reducing process execution time, and thereafter this routine comes to an end.

The many features and advantages of the invention are apparent from the detailed description and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having in an exhaust system a lean NOx catalyst for purifying nitrogen oxide in an exhaust gas in an oxygen excessive state by using a reducing agent, comprising:

$CO_2$ concentration increasing means for increasing a concentration of carbon dioxide in an intake air flowing through an air intake system of said internal combustion engine; and intake air quantity decreasing means for decreasing a quantity of the intake air flowing through the intake system when the nitrogen oxide is required to be purified by said lean $NO_x$ catalyst, wherein said $CO_2$ concentration increasing means is a combustion device provided separately from a body of said internal combustion engine, and said combustion device functions as a $CO_2$ adding device for adding the carbon dioxide to the intake system by introducing a combustion gas into the intake system of said internal combustion engine, and wherein said $CO_2$ concentration increasing means functioning as the $CO_2$ adding device adds the carbon dioxide to the intake air in the intake system when the flowing rate of the intake air in the intake system is decreased by the operation of said intake air quantity decreasing means.

2. An internal combustion engine having a lean NOx catalyst according to claim 1, wherein said intake air quantity decreasing means includes an intake air quantity regulating valve for opening and closing an intake passageway forming a part of the structure of said intake system, and thereby controlling the quantity of the intake air flowing through the intake passageway.

3. An internal combustion engine having a lean NOx catalyst according to claim 2, wherein said combustion device is operated when said internal combustion engine is in a predetermined operation state and burns the fuel, and warms up engine related elements with the heat of the combustion gas emitted when burned.

4. An internal combustion engine having a lean NOx catalyst according to claim 3, wherein the air/fuel ratio of said combustion device is set rich, when the nitrogen oxide is required to be purified by said lean NOx catalyst.

5. An internal combustion engine having a lean NOx catalyst according to claim 3, wherein a fuel injection timing by a fuel injection device is lagged, when the nitrogen oxide is required to be purified by said lean NOx catalyst during the operation of said combustion device.

6. An internal combustion engine having a lean NOx catalyst according to claim 5, wherein said lean NOx catalyst is an occlusive reduction type NOx catalyst.

7. An internal combustion engine having a lean NOx catalyst according to claim 4, wherein said combustion device performs combustion under a pressure lower than a pressure when burned in cylinders of said internal combustion engine.

8. An internal combustion engine having a lean NOx catalyst according to claim 7, wherein said combustion device is operated when the purification of the nitrogen oxide by said lean NOx catalyst is required.

9. An internal combustion engine having a lean NOx catalyst according to claim 1, wherein said combustion device is operated when said internal combustion engine is in a predetermined operation state and burns the fuel, warms up engine related elements with the heat of the combustion gas emitted when burned, and changes an air/fuel ratio respectively at the time when the internal combustion engine is in the predetermined operation state and at the time when the nitrogen oxide is required to be purified by said lean NOx catalyst.

10. An internal combustion engine having a lean NOx catalyst according to claim 4, wherein said lean NOx catalyst is an occlusive reduction type NOx catalyst.

11. An internal combustion engine having a lean NOx catalyst according to claim 4, wherein said lean NOx catalyst is a selective reduction type NOx catalyst.

* * * * *